United States Patent
Lee

(10) Patent No.: US 9,351,222 B2
(45) Date of Patent: May 24, 2016

(54) HANDOVER MANAGEMENT SCHEME

(75) Inventor: Hyoung-Gon Lee, Seoul (KR)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 876 days.

(21) Appl. No.: 13/534,613

(22) Filed: Jun. 27, 2012

(65) Prior Publication Data

US 2014/0004900 A1  Jan. 2, 2014

(51) Int. Cl.
*H04W 36/00* (2009.01)
*H04W 36/32* (2009.01)
*H04W 48/20* (2009.01)

(52) U.S. Cl.
CPC .............. *H04W 36/32* (2013.01); *H04W 48/20* (2013.01)

(58) Field of Classification Search
CPC ...................................................... H04W 36/32
USPC .......................................... 455/436; 370/338
See application file for complete search history.

(56) References Cited

U.S. PATENT DOCUMENTS

| | | | |
|---|---|---|---|
| 5,797,094 A * | 8/1998 | Houde et al. | 455/412.2 |
| 7,130,668 B2 | 10/2006 | Chang et al. | |
| 8,362,924 B2 | 1/2013 | Kim et al. | |
| 2008/0153491 A1* | 6/2008 | Cho et al. | 455/435.1 |
| 2009/0005045 A1 | 1/2009 | Kuriki et al. | |
| 2010/0056175 A1* | 3/2010 | Bachmann et al. | 455/456.1 |
| 2011/0171943 A1 | 7/2011 | Raviv | |
| 2013/0128785 A1* | 5/2013 | Guey et al. | H04W 52/0206 370/311 |
| 2013/0130684 A1* | 5/2013 | Gomes et al. | 455/435.1 |

FOREIGN PATENT DOCUMENTS

| | | |
|---|---|---|
| KR | 10-2005-0025039 | 3/2005 |
| KR | 10-1116902 B1 | 2/2012 |

* cited by examiner

*Primary Examiner* — Marcos Batista
(74) *Attorney, Agent, or Firm* — Brundidge & Stanger, P.C.

(57) ABSTRACT

Technologies are generally described for a handover management scheme. In some examples, a handover management system may include a grouping unit configured to make a group of one or more mobile devices to move together over a predetermined distance, each of the mobile devices operating either in an active state or in an idle state; and a message generation unit configured to generate a first message, wherein the first message enables at least some of the mobile devices receiving the first message to operate either in the active state or in a deep idle state.

24 Claims, 7 Drawing Sheets

HANDOVER MANAGEMENT SCHEME

BACKGROUND

Mobile devices carried by users experience cell transitions at cell boundaries. In particular, the mobile devices carried by passengers in a vehicle such as public transportation (for example, a train or a subway) experience frequent cell transitions. For example, at every cell boundary on a route of the vehicle, the mobile devices in an active state perform a handover procedure, while the mobile devices in an idle state perform a cell reselection procedure. In the idle state, even though no voice call or data communications is taking place, the mobile devices consume considerable power for the frequent cell reselection procedures. This causes inconvenience to the users.

SUMMARY

In an example, a handover management system may include a grouping unit configured to make a group of one or more mobile devices to move together over a predetermined distance, each of the mobile devices operating either in an active state or in an idle state; and a message generation unit configured to generate a first message, wherein the first message enables at least some of the mobile devices receiving the first message to operate either in the active state or in a deep idle state.

In an example, a method performed under control of a handover management system, may include making a group of one or more mobile devices to move together over a predetermined distance, each of the mobile devices operating either in an active state or in an idle state; and generating a first message for enabling at least some of the mobile devices in the group to operate either in the active state or in a deep idle state.

In an example, a computer-readable storage medium may store thereon computer-executable instructions that, in response to execution, cause a handover management system to perform operations, including making a group of one or more mobile devices to move together over a predetermined distance, each of the mobile devices operating either in an active state or in an idle state; and generating a first message for enabling at least some of the mobile devices in the group to operate either in the active state or in a deep idle state.

In an example, a handover management system may include a determination unit configured to determine whether a mobile device is to stay in a predetermined place, the mobile device operating either in an active state or in an idle state; and a message generation unit configured to generate a first message when the determination unit determines that the mobile device is to stay in the predetermined place, wherein the first message enables the mobile device receiving the first message to operate either in the active state or in a deep idle state.

In an example, a method performed under control of a handover management system, may include determining whether a mobile device is to stay in a predetermined place, the mobile device operating either in an active state or in an idle state; and generating a first message for enabling the mobile device to operate either in the active state or in a deep idle state, when determining that the mobile device is to stay in the predetermined place.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
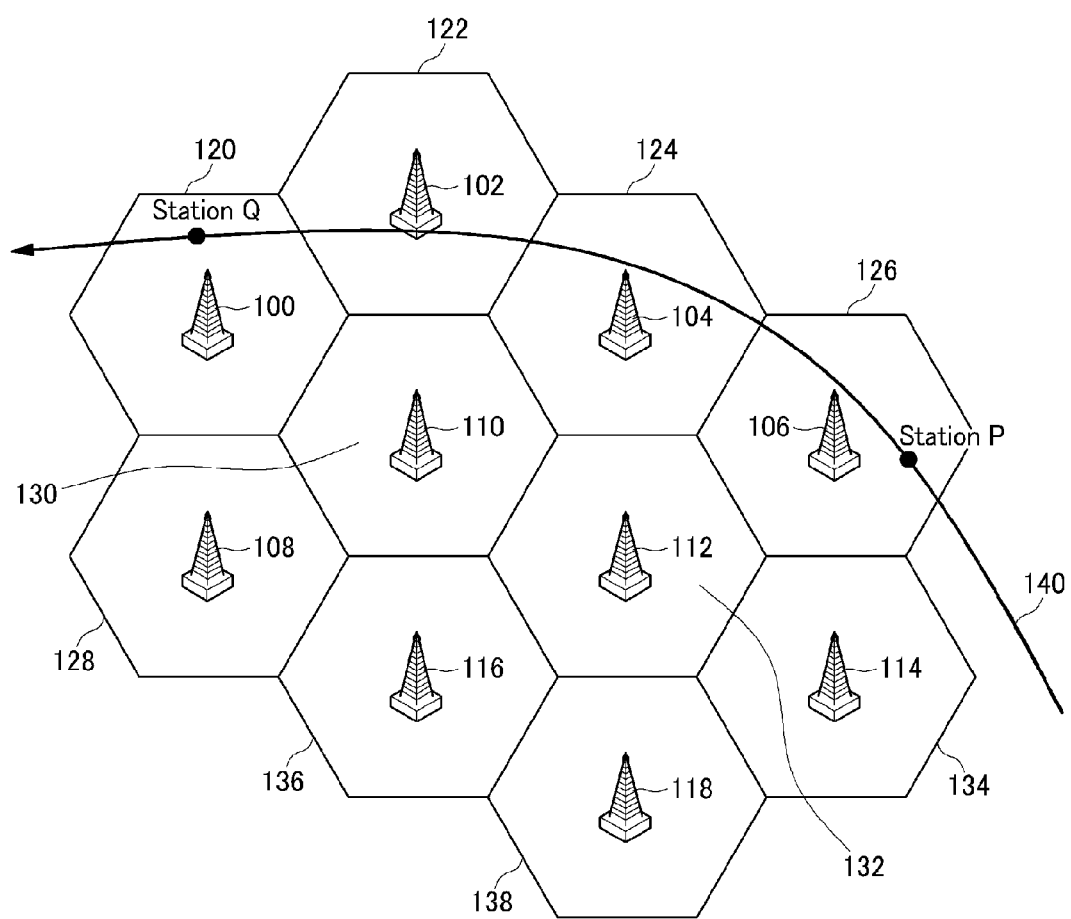
FIG. 1 schematically shows an illustrative example of an environment where handover and/or cell reselection are performed on a route of a vehicle, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to a handover management scheme for a mobile telecommunications system.

Technologies are generally described for enabling a mobile device in an idle state, in which a cell reselection procedure is performed at every cell boundary, to operate in a deep idle state, in which the cell reselection procedure may not be performed, thereby reducing power consumption in the mobile device.

In some examples, a handover management system may enable at least some of multiple mobile devices operated by a mobile service provider to operate in the deep idle state, rather than in the idle state.

In some examples, the handover management system may enable a group of one or more mobile devices to move together over a predetermined distance such as, for example, a group of one or more mobile devices in a vehicle moving from a first station to a second station, to operate in a deep idle state enabled mode where each of the mobile devices operating either in an active state or in the deep idle state, rather than in a normal mode where each of the mobile devices operating either in the active state or in the idle state. In some examples, the handover management system may track which cell the mobile devices operating in the deep idle state are in, based at least in part on handover information of the mobile devices operating in the active state in the group.

In some alternative examples, the handover management system may enable a mobile device which is determined to stay in a predetermined place such as, for example, in a library, in a theater, in an office, or in a house, to operate in the deep idle state enabled mode rather than in the normal mode.

FIG. 1 schematically shows an illustrative example of an environment where handover and/or cell reselection are performed on a route of a vehicle, arranged in accordance with at least some embodiments described herein.

A mobile service provider may provide mobile devices with mobile service via base stations 100, 102, 104, 106, 108, 110, 112, 114, 116 and 118. Base stations 100, 102, 104, 106, 108, 110, 112, 114, 116 and 118 may define cells 120, 122, 124, 126, 128, 130, 132, 134, 136 and 138, respectively. Each of the cells may correspond to the service range provided by each of the base stations.

A vehicle may move along a predetermined route 140. Examples of the vehicle include, but are not limited to, a bus, a tram, a train, a subway, a ferry and a water bus.

In some embodiments, when the vehicle containing one or more passengers moves from station P to station Q along route 140 as depicted in FIG. 1, the mobile devices carried by the passengers may experience cell transition from cell 126 to cell 124, from cell 124 to cell 122, and from cell 122 to cell 120, successively. In a normal mode, mobile devices in an active state may perform a handover procedure, while mobile devices in an idle state may perform a cell reselection procedure at each cell boundary. The mobile service provider may track which cell each of the mobile devices is in, based at least in part on handover information of the corresponding mobile device when it operates in the active state, or cell reselection information thereof when it operates in the idle state.

In some embodiments, in a deep idle state enabled mode, the mobile service provider may enable the mobile devices carried by the passengers to operate either in the active state or in a deep idle state, in which the mobile devices may not perform the cell reselection procedure. In some embodiments, the mobile devices may be operated in the deep idle state enabled mode while the vehicle moves from station P to station Q. In some embodiments, the mobile service provider may make the group of the mobile devices in the vehicle operate in the deep idle state enabled mode when the vehicle departing station P, and make the group of the mobile devices operate in the normal mode again before arriving at station Q.

In some embodiments, in the deep idle state enabled mode, the mobile service provider may track which cell the mobile devices operating in the deep idle state are in, based at least in part on handover information of the mobile devices operating in the active state in the group, since all the mobile devices in the vehicle may move together between station P and station Q.

Figure 2:
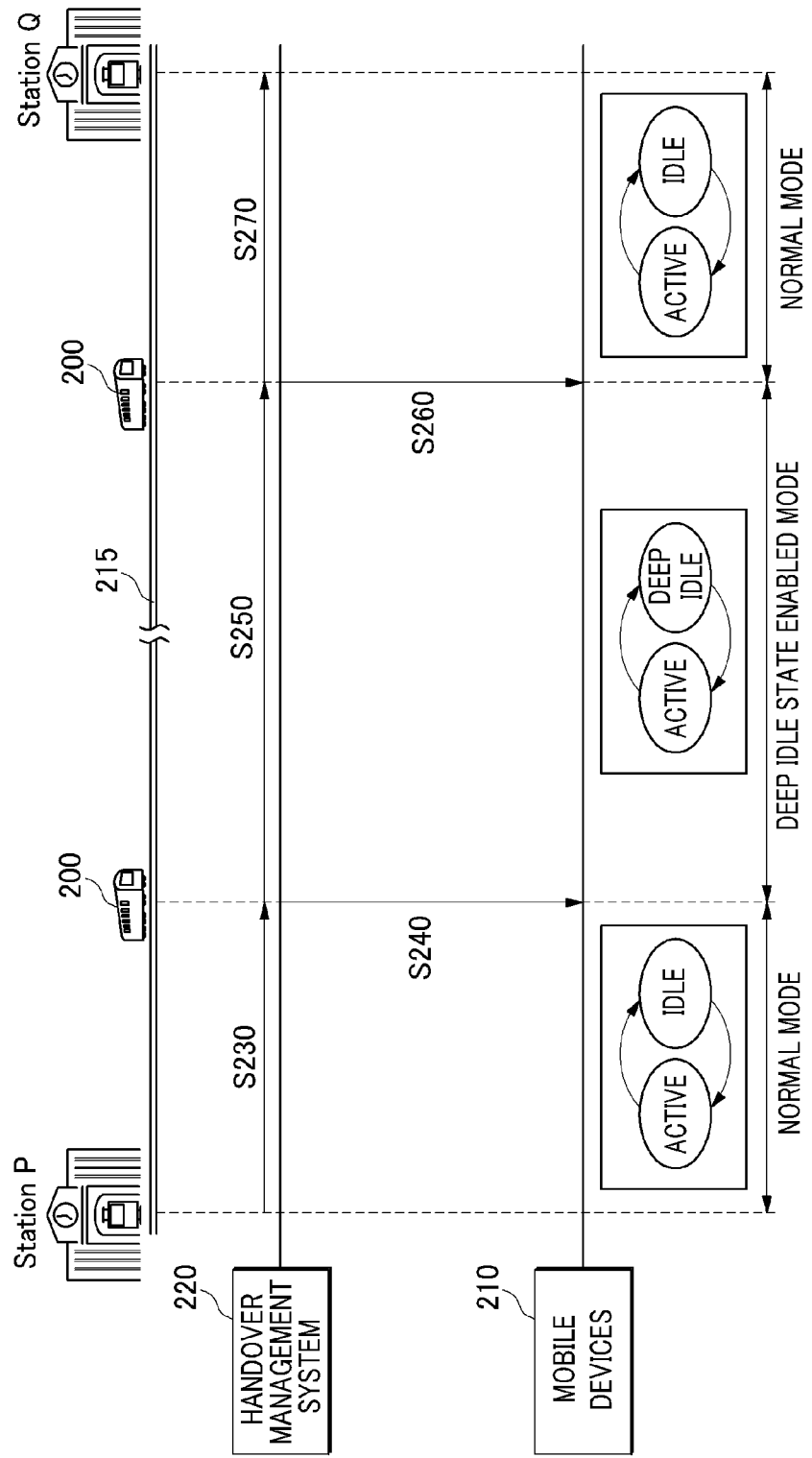
FIG. 2 schematically shows an example process flow employed for providing a handover management scheme for a mobile telecommunications system, arranged in accordance with at least some embodiments described herein.

FIG. 2 schematically shows an example process flow employed for providing a handover management scheme for a mobile telecommunications system, arranged in accordance with at least some embodiments described herein.

As depicted in FIG. 2, a vehicle 200 containing one or more mobile devices 210 may move from station P to station Q. In such cases, mobile devices 210 may move together along a predetermined route 215 from station P to station Q.

In some embodiments, a handover management system 220, which may be controlled by a mobile service provider, may make a group of mobile devices 210 in vehicle 200 when vehicle 200 departing station P (S230). In this stage, mobile devices 210 may operate either in an active state or in an idle state, i.e., in a normal mode.

Then, in some embodiments, handover management system 220 may generate a first message, which may enable at least some of mobile devices 210 receiving the first message to operate either in the active state or in a deep idle state, i.e., in a deep idle state enabled mode, and transmit the first message to at least some of mobile devices 210 in the group (S240). In some embodiments, mobile devices 210 operating in the deep idle state may not perform a cell reselection procedure.

In some embodiments, handover management system 220 in the deep idle state enabled mode may track which cell mobile devices 210 operating in the deep idle state are in, based at least in part on handover information of mobile devices 210 operating in the active state (S250).

In some embodiments, before vehicle 200 arriving station Q, handover management system 220 may generate a second message, which may make the mobile devices receiving the second message operate either in the active state or in the idle state, i.e., in the normal mode, and transmit the second message to at least some of mobile devices 210 in the group (S260).

Then, in some embodiments, handover management system 220 and group of mobile devices 210 in vehicle 200 may operate in the normal mode again (S270).

Figure 3:
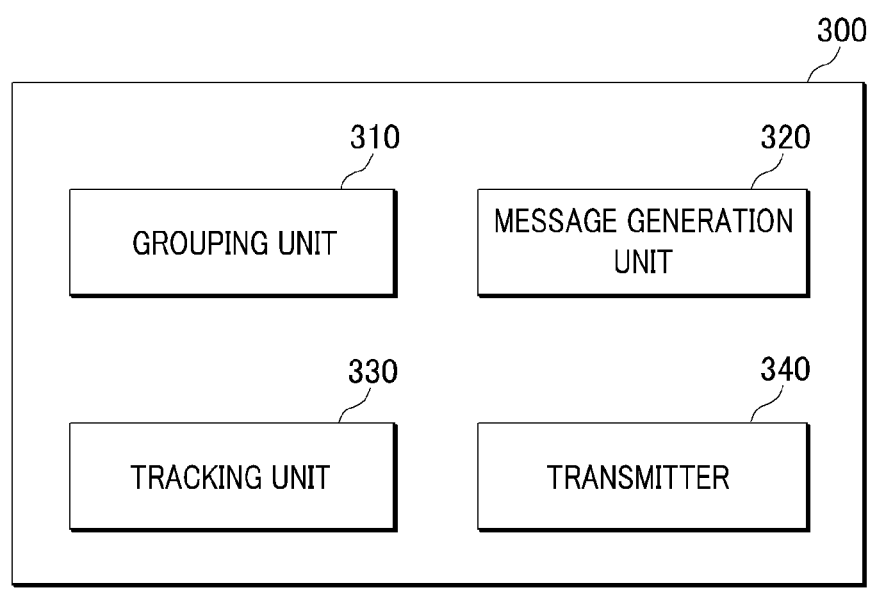
FIG. 3 shows a schematic block diagram illustrating an example architecture for providing a handover management scheme for a mobile telecommunications system, arranged in accordance with at least some embodiments described herein.

FIG. 3 shows a schematic block diagram illustrating an example architecture for providing a handover management scheme for a mobile telecommunications system, arranged in accordance with at least some embodiments described herein.

As depicted, a handover management system 300 may include a grouping unit 310, a message generation unit 320, a tracking unit 330 and a transmitter 340. Although illustrated as discrete components, various components may be divided into additional components, combined into fewer components, or eliminated altogether while being contemplated within the scope of the disclosed subject matter.

Grouping unit 310 may be configured to make a group of one or more mobile devices to move together over a predetermined distance. In some embodiments, the one or more mobile devices may be in a vehicle moving from a first station to a second station. Examples of the vehicle include, but are not limited to, a bus, a tram, a train, a subway, a ferry and a water bus.

In some embodiments, each of the mobile devices may operate either in an active state or in an idle state before and/or when the vehicle departing the first station. In some embodiments, grouping unit 310 may make the group of the one or more mobile devices in the vehicle when the vehicle departing every station. That is, grouping unit 310 may make the group when the vehicle departing the first station, and update the group when the vehicle departing the second station.

In some embodiments, grouping unit 310 may make the group of the one or more mobile devices in the vehicle further based on route information and/or schedule information of the vehicle.

Message generation unit 320 may be configured to generate a first message for enabling at least some of the mobile devices receiving the first message to operate either in the active state or in a deep idle state, and/or a second message for making the mobile devices receiving the second message operate either in the active state or in the idle state. In some embodiments, message generation unit 320 may generate the first message after departing the first station, and generate the second message before arriving at the second station. In some embodiments, the mobile devices operating in the deep idle state may not perform a cell reselection procedure.

Tracking unit 330 may be configured to track which cell the mobile devices operating in the deep idle state are in, based at least in part on handover information of the mobile devices operating in the active state in the group.

In some embodiments, in cases where there is no active mobile device in the group, handover management system 300 may select at least one of the mobile devices in the group, and keep the at least one mobile device in the idle state. That is, handover management system 300 may not make the at least one of the mobile devices in the group operate in the deep idle state. In such cases, tracking unit 330 may track which cell the mobile devices operating in the deep idle state are in, based at least in part on cell reselection information of the at least one mobile device in the idle state. In some embodiments, handover management system 300 may select the at least one mobile device randomly. In some alternative embodiments, handover management system 300 may select the at least one mobile device based at least in part on information on remaining battery power of the mobile devices in the group.

Transmitter 340 may be configured to transmit messages generated by message generation unit 320, e.g., the first message and/or the second message, to at least some of the mobile devices in the group. In some alternative embodiments, transmitter 340 may transmit or broadcast to all available devices in a cell in which the group of the mobile devices are in at the time of transmitting the messages, the messages generated by message generation unit 320, with device identification of the mobile devices in the group, so that the mobile devices in the group receiving the messages may change their operation mode.

Figure 4:
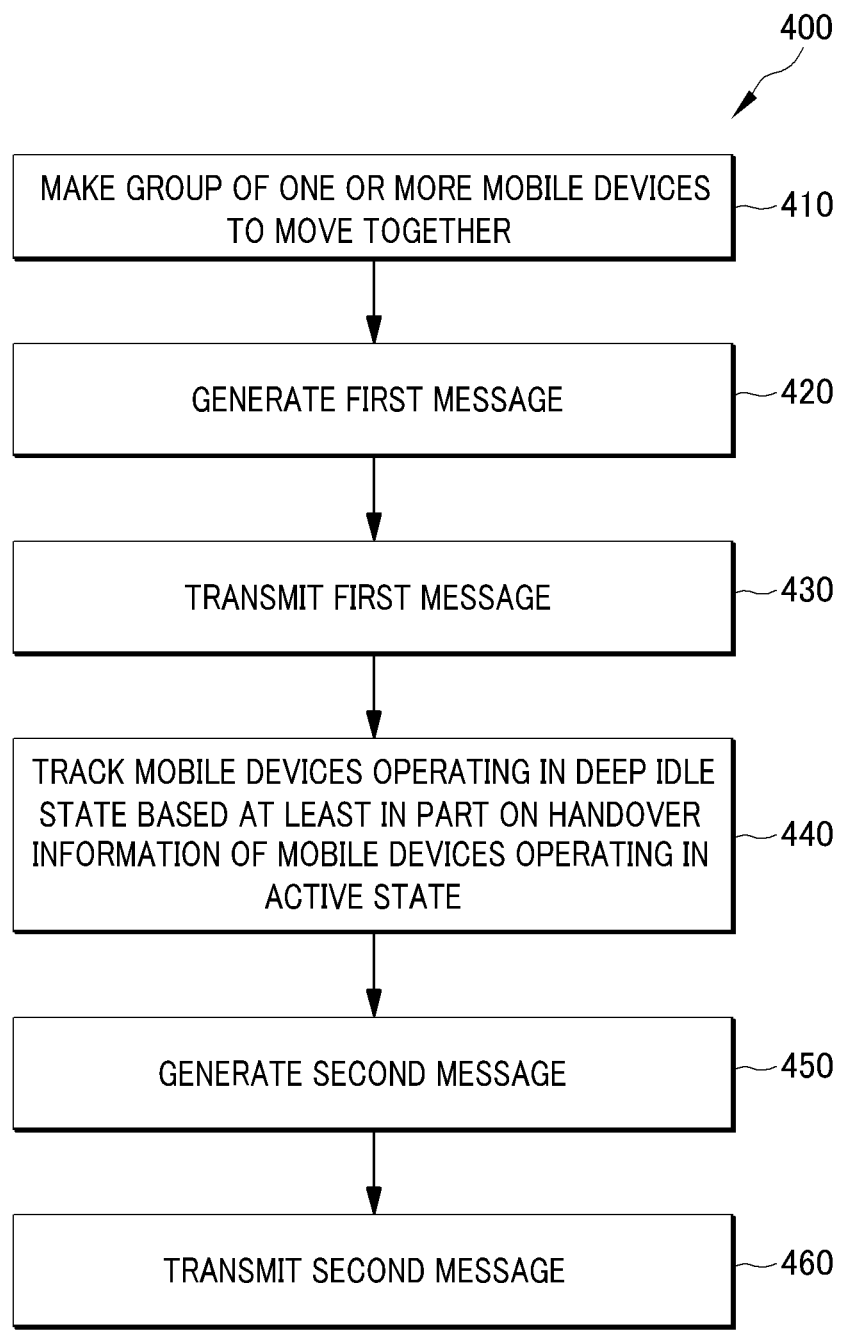
FIG. 4 shows an example flow diagram of a process for providing a handover management scheme for a mobile telecommunications system, arranged in accordance with at least some embodiments described herein.

FIG. 4 shows an example flow diagram of a process for providing a handover management scheme for a mobile telecommunications system, arranged in accordance with at least some embodiments described herein.

The process in FIG. 4 may be implemented in a handover management system such as handover management system 300 including grouping unit 310, message generation unit 320, tracking unit 330 and transmitter 340. An example process 400 may include one or more operations, actions, or functions as illustrated by one or more blocks 410, 420, 430, 440, 450 and/or 460. Although illustrated as discrete blocks, various blocks may be divided into additional blocks, combined into fewer blocks, or eliminated, depending on the desired implementation. Processing may begin at block 410.

At block 410, the handover management system may make a group of one or more mobile devices to move together over a predetermined distance. In some embodiments, the one or more mobile devices may be in a vehicle moving from a first station to a second station. In some embodiments, each of the mobile devices may operate either in an active state or in an idle state before and/or when the vehicle departing the first station. Processing may continue from block 410 to block 420.

At block 420, the handover management system may generate a first message for enabling at least some of the mobile devices in the group to operate either in the active state or in a deep idle state. In the deep idle state, the mobile devices may not perform a cell reselection procedure. Processing may continue from block 420 to block 430.

At block 430, the handover management system may transmit the first message to at least some of the mobile devices in the group. In some alternative embodiments, the handover management system may transmit or broadcast to all available devices in a cell in which the group of the mobile devices are in at the time of transmitting the first message, the first message with device identification of the mobile devices in the group, so that the mobile devices in the group receiving the first message may operate either in the active state or in the deep idle state. Processing may continue from block 430 to block 440.

At block 440, the handover management system may track which cell the mobile devices operating in the deep idle state are in, based at least in part on handover information of the mobile devices operating in the active state in the group. In some embodiments, in cases where there is no active mobile device in the group, the handover management system may select at least one of the mobile devices in the group, and keep the at least one mobile device in the idle state. That is, the handover management system may not make the at least one of the mobile devices in the group operate in the deep idle state. In such cases, the handover management system may track which cell the mobile devices operating in the deep idle state are in, based at least in part on cell reselection information of the at least one mobile device in the idle state. Processing may continue from block 440 to block 450.

At block 450, the handover management system may generate a second message for making the group of the one or more mobile devices to operate either in the active state or in the idle state. Processing may continue from block 450 to block 460.

At block 460, the handover management system may transmit the second message to at least some of the mobile devices in the group. In some alternative embodiments, the handover management system may transmit or broadcast to all available devices in a cell in which the group of the mobile devices are in at the time of transmitting the second message, the second message with device identification of the mobile devices in the group, so that the mobile devices in the group receiving the second message may again operate either in the active state or in the idle state.

By employing handover management system 300 as shown in FIG. 3 and/or process 400 as shown in FIG. 4, the cell reselection procedure may not be performed in at least some of the mobile devices in the group, thereby reducing power consumption in the corresponding mobile devices.

Figure 5:
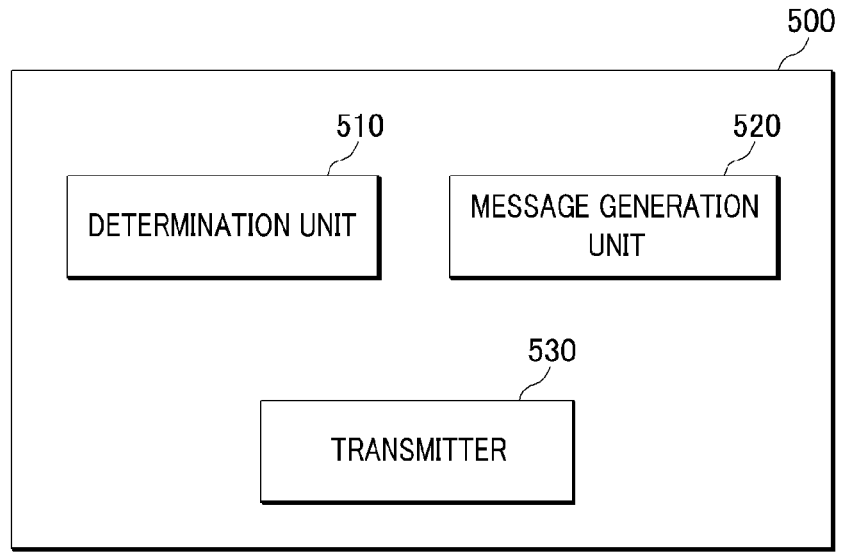
FIG. 5 shows a schematic block diagram illustrating another example architecture for providing a handover management scheme for a mobile telecommunications system, arranged in accordance with at least some embodiments described herein.

FIG. 5 shows a schematic block diagram illustrating another example architecture for providing a handover management scheme for a mobile telecommunications system, arranged in accordance with at least some embodiments described herein.

As depicted, a handover management system 500 may include a determination unit 510, a message generation unit 520 and a transmitter 530. Although illustrated as discrete components, various components may be divided into additional components, combined into fewer components, or eliminated altogether while being contemplated within the scope of the disclosed subject matter.

Determination unit 510 may be configured to determine whether a mobile device, which operates either in an active state or in an idle state, is to stay in a predetermined place. By way of example, but not limitation, the mobile device may not move and thus need not perform a cell reselection procedure, when a user of the mobile device sees a movie or a play in a theater, studies in a library, works in an office, or sleeps at home, etc. In such cases, determination unit 510 may determine that the mobile device is to stay in the predetermined place.

In some embodiments, determination unit 510 may determine whether the mobile device is to stay in the predetermined place based at least in part on information received from the mobile device. By way of example, but not limitation, when the user enters the theater, he/she may use the mobile device as a kind of mobile admission ticket, for example, by tagging the mobile device onto a predetermined device located at an entrance of the theater. In such cases, the device located at the entrance may inform determination unit 510 that the mobile device may be going to stay in the theater. Then, determination unit 510 may determine that the mobile device is to stay in the predetermined place based at least in part on the information from the device located at the entrance. Meanwhile, when the user leaves the theater, the user may also tag the mobile device onto a predetermined device located at an exit of the theater. In such cases, the device located at the exit may inform determination unit 510 that the mobile device may no longer stay in the theater. Then, determination unit 510 may determine that the mobile device is not to stay in the predetermined place based at least in part on the information from the device located at the exit.

In some embodiments, determination unit 510 may determine whether the mobile device is to stay in the predetermined place based at least in part on whether the mobile device has stayed in the predetermined place for a predetermined time period. By way of example, but not limitation, determination unit 510 may determine whether the mobile device has stayed in the predetermined place based at least in part on GPS (Global Positioning System) information of the mobile device, G-sensor or accelerometer information of the mobile device, information from Wi-Fi access points around the mobile device, and so on.

Message generation unit 520 may be configured to generate a first message when determination unit 510 determines that the mobile device is to stay in the predetermined place, and generate a second message when determination unit 510 determines that the mobile device is not to stay in the predetermined place. In some embodiments, the first message may enable the mobile device receiving the first message to operate either in the active state or in a deep idle state, the mobile device operating in which may not perform the cell reselection procedure. In some embodiments, the second message may make the mobile device receiving the second message operate either in the active state or in the idle state.

Transmitter 530 may be configured to transmit to the mobile device messages generated by message generation unit 520, e.g., the first message and/or the second message.

Figure 6:
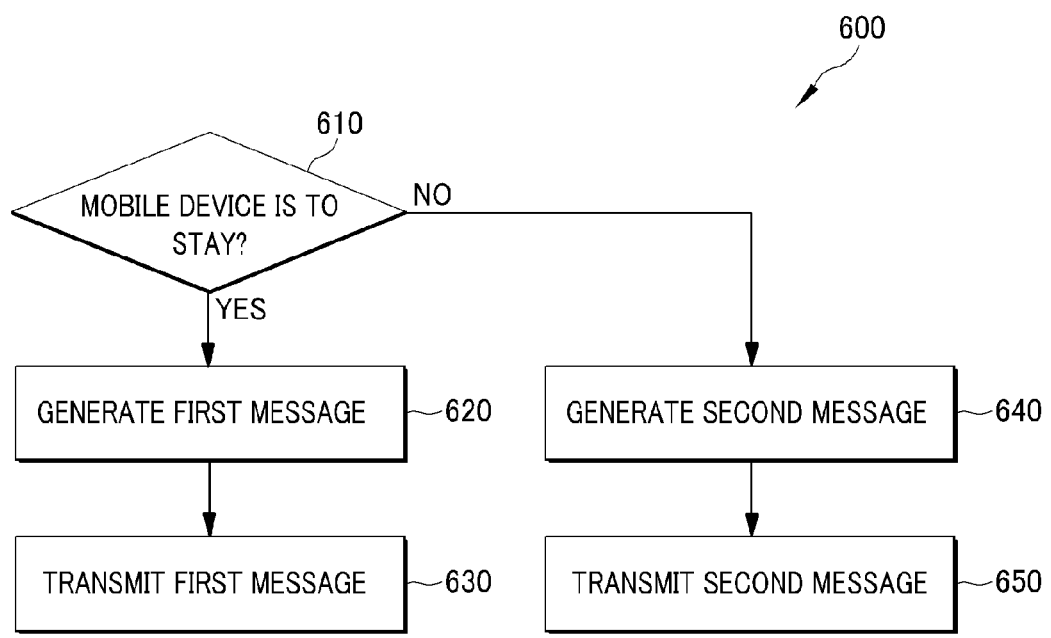
FIG. 6 shows another example flow diagram of a process for providing a handover management scheme for a mobile telecommunications system, arranged in accordance with at least some embodiments described herein.

FIG. 6 shows another example flow diagram of a process for providing a handover management scheme for a mobile telecommunications system, arranged in accordance with at least some embodiments described herein.

The process in FIG. 6 may be implemented in a handover management system such as handover management system 500 including determination unit 510, message generation unit 520 and transmitter 530. An example process 600 may include one or more operations, actions, or functions as illustrated by one or more blocks 610, 620, 630, 640 and/or 650. Although illustrated as discrete blocks, various blocks may be divided into additional blocks, combined into fewer blocks, or eliminated, depending on the desired implementation. Processing may begin at block 610.

At block 610, the handover management system may determine whether a mobile device, which operates either in an active state or in an idle state, is to stay in a predetermined place. In some embodiments, the handover management system may determine whether the mobile device is to stay in the predetermined place based at least in part on information received from the mobile device. In some alternative embodiments, the handover management system may determine whether the mobile device is to stay in the predetermined place based at least in part on whether the mobile device has stayed in the predetermined place for a predetermined time period.

When the handover management system determines that the mobile device is to stay in the predetermined place, processing may continue from block 610 to block 620, while determines that the mobile device is not to stay in the predetermined place, processing may continue to block 640.

At block 620, the handover management system may generate a first message for enabling the mobile device to operate either in the active state or in a deep idle state. In some embodiments, the mobile device operating in the deep idle state may not perform the cell reselection procedure. Processing may continue from block 620 to block 630.

At block 630, the handover management system may transmit the first message to the mobile device, so that the mobile device receiving the first message may operate either in the active state or in the deep idle state.

At block 640, the handover management system may generate a second message for making the mobile device operate either in the active state or in the idle state. Processing may continue from block 640 to block 650.

At block 650, the handover management system may transmit the second message to the mobile device, so that the mobile device receiving the second message may operate either in the active state or in the idle state.

By employing handover management system 500 as shown in FIG. 5 and/or process 600 as shown in FIG. 6, the cell reselection procedure may not be performed in the mobile device which is expected to stay in the predetermined place for a while, thereby reducing power consumption in the mobile device.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 7:
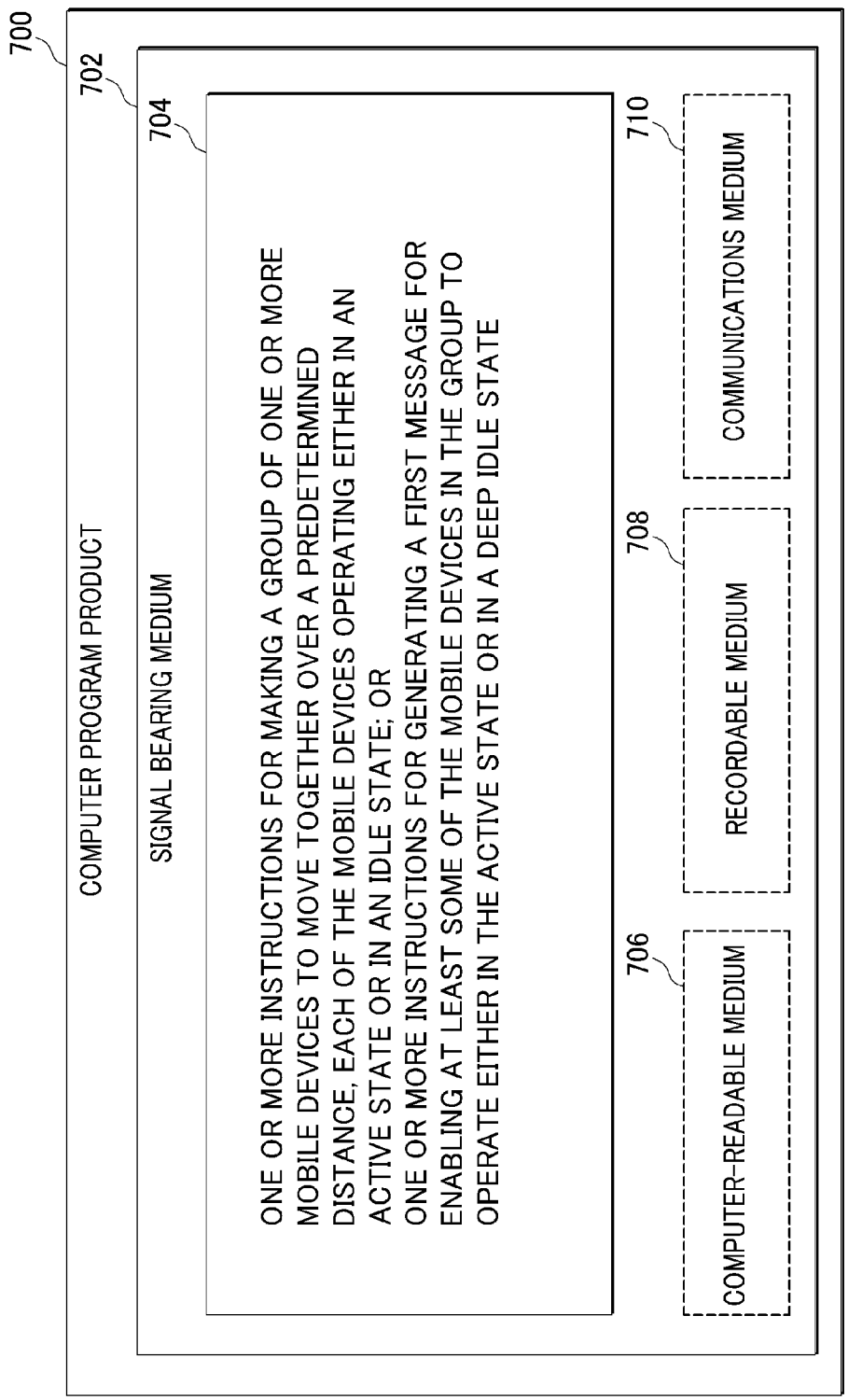
FIG. 7 illustrates an example computer program product that may be utilized to provide a handover management scheme for a mobile telecommunications system, arranged in accordance with at least some embodiments described herein.

FIG. 7 illustrates an example computer program product that may be utilized to provide a handover management scheme for a mobile telecommunications system, arranged in accordance with at least some embodiments described herein.

Computer program product 700 may include a signal bearing medium 702. Signal bearing medium 702 may include one or more instructions 704 that, when executed by, for example, a processor, may provide the functionality described above with respect to FIGS. 1-4. By way of example, instructions 704 may include: one or more instructions for making a group of one or more mobile devices to move together over a predetermined distance, each of the mobile devices operating either in an active state or in an idle state; one or more instructions for generating a first message for enabling at least some of the mobile devices in the group to operate either in the active state or in a deep idle state. Thus, for example, referring to FIG. 3, handover management system 300 may undertake one or more of the blocks shown in FIG. 4 in response to instructions 704.

In some implementations, signal bearing medium 702 may encompass a computer-readable medium 706, such as, but not limited to, a hard disk drive, a CD, a DVD, a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, computer program product 700 may be conveyed to one or more modules of handover management system 300 by an RF signal bearing medium 702, where the signal bearing medium 702 is conveyed by a wireless communications medium 710 (e.g., a wireless communications medium conforming with the IEEE 802.11 standard).

Figure 8:
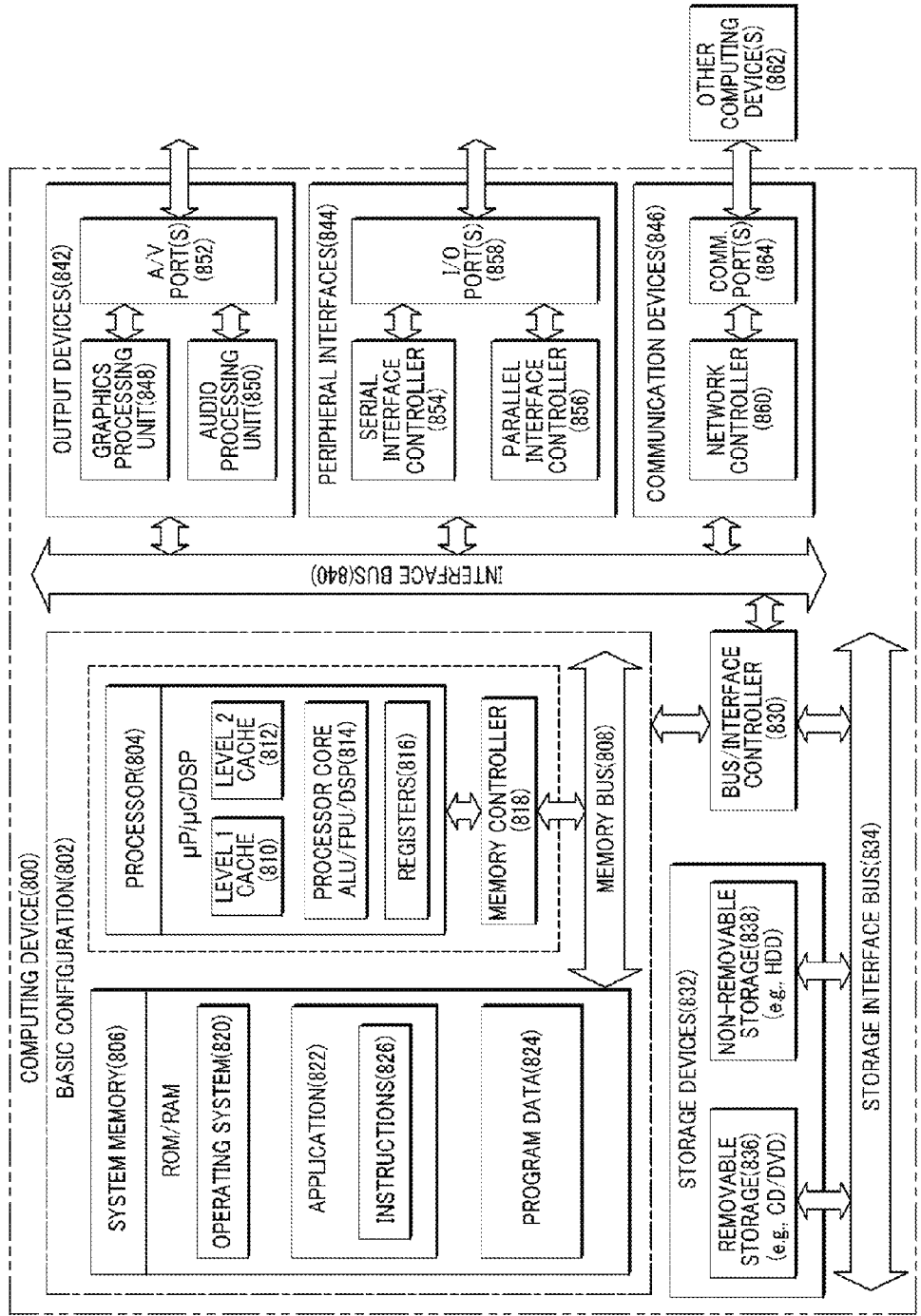
FIG. 8 is a block diagram illustrating an example computing device that may be utilized to provide a handover management scheme for a mobile telecommunications system, arranged in accordance with at least some embodiments described herein.

FIG. 8 is a block diagram illustrating an example computing device that may be utilized to provide a handover management scheme for a mobile telecommunications system, arranged in accordance with at least some embodiments described herein.

In these examples, elements of computing device 800 may be arranged or configured for an electronic device, such as, for example, a mobile phone, a smartphone, a personal digital assistant (PDA), a tablet, a laptop computer, a desktop computer. In a very basic configuration 802, computing device 800 typically includes one or more processors 804 and a system memory 806. A memory bus 808 may be used for communicating between processor 804 and system memory 806.

Depending on the desired configuration, processor 804 may be of any type including but not limited to a microprocessor (µP), a microcontroller (µC), a digital signal processor (DSP), or any combination thereof. Processor 804 may include one more levels of caching, such as a level one cache 810 and a level two cache 812, a processor core 814, and registers 816. An example processor core 814 may include an arithmetic logic unit (ALU), a floating point unit (FPU), a digital signal processing core (DSP Core), or any combination thereof. An example memory controller 818 may also be used with processor 804, or in some implementations memory controller 818 may be an internal part of processor 804.

Depending on the desired configuration, system memory 806 may be of any type including but not limited to volatile memory (such as RAM), non-volatile memory (such as ROM, flash memory, etc.) or any combination thereof. System memory 806 may include an operating system 820, one or more applications 822, and program data 824. Application 822 may include instructions 826 that may be arranged to perform the functions as described herein including the actions described with respect to the handover management system 300 architecture as shown in FIG. 3 or including the actions described with respect to the flow charts shown in FIG. 4. In some examples, application 822 may be arranged to operate with program data 824 on an operating system 820 such that implementations for instructions for a handover management system as described herein.

Computing device 800 may have additional features or functionality, and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. Data storage devices 832 may be removable storage devices 836, non-removable storage devices 838, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 806, removable storage devices 836 and non-removable storage devices 838 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

Computing device 800 may also include an interface bus 840 for facilitating communication from various interface devices (e.g., output devices 842, peripheral interfaces 844, and communication devices 846) to basic configuration 802 via bus/interface controller 830. Example output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 846 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A handover management system, comprising:
   a grouping unit configured to make a group of one or more mobile devices, wherein the group comprises the one or more mobile devices moving together over a predetermined distance and each of the mobile devices operating either in an active state or in a deep idle state and the mobile devices operating in the deep idle state do not perform a cell reselection procedure; and
   a message generation unit configured to generate a first message comprising instructions executed by a mobile device to change an operation mode of the mobile device upon receiving the first message, wherein the first message enables at least some of the mobile devices that receive the first message to change a respective operation mode to the active state when the respective operation mode is operating in the deep idle state and change the respective operation mode to the deep idle state when the respective operation mode is operating in the active state.

2. The handover management system of claim 1, further comprising:
a tracking unit configured to track in which cell the mobile devices operating in the deep idle state are located, based at least in part on handover information of the mobile devices operating in the active state in the group.

3. The handover management system of claim 1, wherein:
each of the mobile devices further comprise an idle state, and
the message generation unit is further configured to generate a second message, wherein the second message enable the mobile devices that receive the second message to operate either in the active state or in the idle state.

4. The handover management system of claim 3, wherein the one or more mobile devices are in a vehicle moving from a first station to a second station,
wherein the grouping unit is further configured to make the group of the one or more mobile devices in the vehicle when the vehicle departs the first station, and
wherein the message generation unit is further configured to generate the first message after the vehicle departs the first station, and generate the second message before the vehicle arrives at the second station.

5. The handover management system of claim 4, wherein the grouping unit is further configured to update the group when the vehicle departs the second station.

6. The handover management system of claim 1, further comprising:
a transmitter configured to transmit messages generated by the message generation unit to at least some of the mobile devices in the group.

7. A method performed under control of a handover management system, comprising:
making a group of one or more mobile devices, wherein the group comprising the one or more mobile devices moving together over a predetermined distance and each of the mobile devices operating either in an active state or in a deep idle state and the mobile devices operating in the deep idle state do not perform a cell reselection procedure; and
generating a first message comprising instructions executed by a mobile device to change an operation mode of the mobile device upon receiving the first message, wherein the first message enables at least some of the mobile devices in the group to change a respective operation mode to the active state when the respective operation mode is operating in the deep idle state and change the respective operation mode to the deep idle state when the respective operation mode is operating in the active state.

8. The method of claim 7, further comprising:
tracking in which cell the mobile devices operating in the deep idle state are located, based at least in part on handover information of the mobile devices operating in the active state in the group.

9. The method of claim 7, further comprising:
tracking in which cell the mobile devices operating in the deep idle state are located, based at least in part on cell reselection information of at least one mobile device operating in the idle state in the group when there is no active mobile device in the group.

10. The method of claim 7, further comprising:
transmitting the first message to at least some of the mobile devices in the group.

11. The method of claim 7, wherein each of the mobile devices further comprise an idle state, the method further comprising:
generating a second message to enable the group of the one or more mobile devices to operate either in the active state or in the idle state.

12. The method of claim 11, further comprising:
transmitting the second message to at least some of the mobile devices in the group.

13. A non-transitory computer-readable storage medium having stored thereon computer-executable instructions that, in response to execution, cause a handover management system to perform operations, comprising:
making a group of one or more mobile devices, wherein the group comprises the one or more mobile devices moving together over a predetermined distance and each of the mobile devices operating either in an active state or in a deep idle state and the mobile devices operating in the deep idle state do not perform a cell reselection procedure; and
generating a first message comprising instructions executed by a mobile device to change an operation mode of the mobile device upon receiving the first message, wherein the first message enables at least some of the mobile devices in the group to change a respective operation mode to the active state when the respective operation mode is operating in the deep idle state and change the respective operation mode to the deep idle state when the respective operation mode is operating in the active state.

14. A handover management system comprising:
a determination unit configured to determine whether a mobile device is to stay in a predetermined place, the mobile device operating either in an active state or in a deep idle state and the mobile devices operating in the deep idle state do not perform a cell reselection procedure; and
a message generation unit configured to generate a first message when the determination unit determines that the mobile device is to stay in the predetermined place, wherein the first message comprises instructions executed by a mobile device to change an operation mode of the mobile device to the active state when the respective operation mode is operating in the deep idle state upon receiving the first message and change the respective operation mode to the deep idle state when the respective operation mode is operating in the active state upon receiving the first message.

15. The handover management system of claim 14, wherein the determination unit is further configured to determine whether the mobile device is to stay in the predetermined place based at least in part on information received from the mobile device.

16. The handover management system of claim 14, wherein the determination unit is further configured to determine whether the mobile device is to stay in the predetermined place based at least in part on whether the mobile device has been in the predetermined place for a predetermined time period.

17. The handover management system of claim 14, wherein:
the mobile device further comprises an idle state, the message generation unit is further configured to generate a second message when the determination unit determines that the mobile device is not to stay in the predetermined place, and the second message enables the mobile device receiving the second message to operate either in the active state or in the idle state.

18. The handover management system of claim 14, further comprising:

a transmitter configured to transmit messages generated by the message generation unit to the mobile device.

19. A method performed under control of a handover management system, comprising:

determining whether a mobile device is to stay in a predetermined place, the mobile device operating either in an active state or in a deep idle state and the mobile devices operating in the deep idle state do not perform a cell reselection procedure; and generating a first message comprising instructions executed by a mobile device to change an operation mode of the mobile device to operate in the active state when the operation mode is operating in the deep idle state upon receiving the first message and change the operation mode to the deep idle state when the operation mode is operating in the active state upon receiving the first message, when determining that the mobile device is to stay in the predetermined place.

20. The method of claim 19, wherein the determining is based at least in part on information received from the mobile device.

21. The method of claim 19, wherein the determining is based at least in part on whether the mobile device has stayed in the predetermined place for a predetermined time period.

22. The method of claim 19, further comprising:
transmitting the first message to the mobile device.

23. The method of claim 19, wherein the mobile device further comprises an idle state, the method further comprising:

generating a second message for making the mobile device to operate either in the active state or in the idle state, when the determination unit determines that the mobile device is not to stay in the predetermined place.

24. The method of claim 23, further comprising:
transmitting the second message to the mobile device.

* * * * *